United States Patent [19]
Delfosse et al.

[11] 3,959,192
[45] May 25, 1976

[54] USE OF ULTRAFINE NATURAL CALCIUM CARBONATES AS FILLERS IN NATURAL AND SYNTHETIC POLYMERS

[75] Inventors: Pierre Delfosse, Paris, France; Alfred Bosshard, Oftringen, Switzerland

[73] Assignee: Pluss-Staufer Ag, Switzerland

[22] Filed: Mar. 7, 1975

[21] Appl. No.: 556,371

Related U.S. Application Data

[63] Continuation of Ser. No. 401,497, Sept. 27, 1973, abandoned.

[30] Foreign Application Priority Data

Feb. 26, 1973 Germany............................ 2309516
Oct. 18, 1972 Germany............................ 2251099

[52] U.S. Cl. .............................. 260/2.5 R; 106/306; 260/42.37; 260/42.47; 260/42.49
[51] Int. Cl.² ....................... C08J 9/00; C08K 3/26
[58] Field of Search ........................... 423/430, 432; 260/2.5 R, 42.47, 42.49, 42.37; 106/306

[56] References Cited
UNITED STATES PATENTS

| | | | |
|---|---|---|---|
| 3,268,388 | 8/1966 | Bauman et al. | 423/432 |
| 3,373,134 | 3/1968 | Yasui et al. | 260/42.37 |
| 3,443,890 | 5/1969 | Sisson et al. | 423/432 |

OTHER PUBLICATIONS

Kraus–Reinforcement of Elastomers (Interscience) (N.Y.) (1965), pp. 187–188.
Rubber World–Materials & Compounding Ingredients for Rubber (Bill Publications) (N.Y.) (1968), pp. 280 & 294.

Primary Examiner—Donald E. Czaja
Assistant Examiner—H. H. Fletcher
Attorney, Agent, or Firm—Pollock, Vande Sande & Priddy

[57] ABSTRACT

Filled polymer containing natural calcium carbonate having a statistical particle diameter of from 0.5 to 0.7 micron and average maximum diameter of from 3 to 4 microns.

8 Claims, No Drawings

USE OF ULTRAFINE NATURAL CALCIUM CARBONATES AS FILLERS IN NATURAL AND SYNTHETIC POLYMERS

This is a continuation, of application Ser. No. 401,497, filed Sept. 27, 1973, and now abandoned.

German Pat. application P 22 51 099.2 and corresponding U.S. Pat. application Ser. No. 401,487 filed Sept. 27, 1973, now U.S. Pat. No. 3,904,130, relate to a mill for grinding minerals which are used as pigments or fillers, said mill being characterised in that the grinding elements consist of 30 to 70% by weight of zirconium oxide, 0.1 to 5% by weight of aluminium oxide and 5 to 20% by weight of silicon oxide.

This mill enables ultrafine minerals to be prepared. For example, chalk from coccolith shells can be ground ultrafine.

The use of natural calcium carbonate as filler in natural and synthetic polymers is already known.

Natural calcium carbonates have been used for a long time in the rubber industry where they are predominantly used as inexpensive fillers to give "body" to the mixtures and to reduce the cost price thereof. Furthermore, natural calcium carbonates are also used in chemical foams based on PVC, in hard PVC and in coating PVC.

Since the finest natural calcium carbonates hitherto known have an average statistical particle diameter of 2 to 4 $\mu$ and a maximum of 10 to 20 $\mu$, their practical usefulness is restricted; in some fields natural calcium carbonates are virtually not used at all.

The use of natural calcium carbonate as filler in natural and synthetic polymers has the main disadvantage that the static and, above all, the dynamic and physical properties of the products are impaired. These fillers are therefore also called "degrading fillers".

In order to obviate these disadvantages, synthetic calcium carbonates or other minerals have already been used, which were prepared by precpitation or other suitable processes. These fillers have mainly the disadvantage of being usable only for special purposes because of their comparatively complicated production, and hence not being usable at all in rubber, foams, hard PVC and coating PVC, and of giving rise to a very high comsumption of binding agent because of their needle-shaped structure.

Calcium carbonates of various degrees of fineness and different origin have been tested in extensive series of experiments over many years for their usability as fillers in natural and synthetic polymers. In further developing the invention of the main patent, German Patent Specification . . . (Patent application P 22 51 099.2) it has now been found that, surprisingly, ultrafine natural calcium carbonates with an average statistical particle diameter of 0.5 to 0.7 $\mu$ and a maximum of 3 to 4 $\mu$ can be used as fillers in natural and synthetic polymers.

Chalks from coccolith shells or crystalline calcite are primarily suitable as calcium carbonates.

The ultrafine natural calcium carbonates of the invention are preferably suitable as fillers in rubber, chemical foams based on PVC, in hard PVC and coating PVC.

The following comparative tests show the advantage of using the calcium carbonates of the invention in the rubber industry:

Example 1a

Comparison of ordinary natural calcium carbonate with the ultrafine natural calcium carbonate of the invention.

Both fillers were used in the following mixture:

| | | |
|---|---|---|
| natural rubber | 100 | p.b.w. |
| stearic acid | 1 | " |
| zinc oxide | 5 | " |
| 2,6-ditert.-butyl paracresol | 1 | " |
| filler | 120 | " |
| sulphur | 3 | " |
| 2,2'-dithio-bis[benzothiazole] | 0.8 | " |
| diorto-tolyl-guanidine | 0.2 | " |

In both cases the vulcanization was carried out at 145°C for 12 minutes. The test results are shown in the following Table 1a:

Table Ia

| | ordinary carbonate | ultrafine carbonate |
|---|---|---|
| breaking strength (daN/sq.cm) | 175 | 200 |
| module at 300% (daN/sq.cm) | 50 | 62 |
| elongation (%) | 520 | 550 |
| tear strength (daN/sq.cm) | 28 | 37 |
| hardness (degrees shore) | 61 | 61 |

The superiority of the ultrafine natural calcium carbonate is obvious.

Example 1b:

Diluting effect of ultrafine "carbonized " fillers.

In a mixture based on polychloropren, 12% and then 38% of the reinforcing fillers were successively replaced with ultrafine natural calcium carbonate, the substitution taking place for the purpose of keeping the hardness of the vulcanization product constant. For comparison, 12% of the reinforcing fillers were replaced with ordinary calcium carbonate. The basic mixture was as follows:

| | | |
|---|---|---|
| polychloroprene rubber | 100 | p.b.w. |
| zinc oxide | 5 | " |
| stearic acid | 0.5 | " |
| magnesia of high activity | 4 | " |
| antioxidant | 2 | " |
| light oil | 2 | " |
| 2-mercapto-imidazoline | 0.5 | " |
| gas black, type SRP | variable | |
| calcium carbonate | variable | |

After vulcanization of the mixtures, the characteristics listed in Table Ib were found:

Table Ib

| | sample | ultrafine calcium carbonate | | ordinary calcium carbonate |
|---|---|---|---|---|
| gas black SRF (% polymer) | 52 | 40 | 32 | 40 |
| carbonate (% polymer) | — | 20 | 35 | 20 |
| hardness (degrees shore) | 65 | 65 | 65 | 65 |
| breaking strength (daN/sq.cm) | 200 | 200 | 160 | 165 |
| elongation (%) | 275 | 320 | 380 | 310 |
| tear strength (daN/cm) | 28 | 28 | 28 | 23 |
| remanence, % during compression (72 h/100°C) | 27 | 27 | 30 | 28 |

The diluting effect of the ultrafine calcium carbonate of the invention is obvious, since the replacement of more than 10% of the reinforcing fillers with the diluting filler did virtually not change the properties of the vulcanization product.

The results obtained with ordinary calcium carbonate under the same conditions are poorer, even poorer than those obtained when almost 40% of the active filler are replaced with the inert diluting filler.

Example 1c:

Improvement of the dispersion of the reinforcing fillers.

In the following mixture:

| | | |
|---|---|---|
| natural rubber | 100 | p.b.w. |
| stearic acid | 1 | ,, |
| zinc oxide | 5 | ,, |
| plasticizing oil | 3 | ,, |
| diethylene glycol | 2 | ,, |
| sulphur | 2.3 | ,, |
| 2,2''-dithio-bis[benzothiazole] | 0.8 | ,, |
| bis(dimethyl-thiocarbamoyl) disulphide | 0.2 | ,, |
| triethanolamine | 0.2 | ,, |
| precipitated silica | 30 | ,, | two parts of the reinforced filler were replaced with 7 to 8 parts of the ultrafine calcium carbonate of the invention; the finished vulcanization product retained the same hardness as the sample without carbonate.

After optimal vulcanization, the properties listed in Table Ic were obtained. —

Table Ic

| | sample | — |
|---|---|---|
| silica (% elastomers) | 30 | 28 |
| ultrafine carbonate (% elastomer) | — | 7.5 |
| breaking strength (daN/sq.cm) | 285 | 310 |
| module at 300% (daN/sq.cm) | 34 | 35 |
| elongation, % | 715 | 710 |
| tear strength (daN/sq.cm) | 68 | 74 |
| hardness (degrees shore) | 55 | 55 |
| remanence after compression (%) | 35 | 33 |

The values show that the presence of a small amount of ultrafine calcium carbonate does not lead to any deterioration of the physical properties but, on the contrary, makes it possible substantially to increase the breaking strength and the tear strength of the vulcanization products.

In particular, the use of the ultrafine calcium carbonates according to the invention offers the following advantages:

a. improved mechanical properties, compared with the conventional products;
b. a diluting effect of the conventional reinforcing fillers;
c. an improved dispersion of the reinforcing fillers leading to improved properties of the vulcanization products, since a better mixture with the elastomers is achieved;
d. an improved surface appearance of the final product.

The ultrafine natural calcium carbonates of the invention are also preferably suitable as fillers in chemical foams based on PVC.

The use of mineral fillers, e.g. natural calcium carbonates, in chemical foams based on PVC has primarily the purpose of reducing the cost of material of the mixtures. However, it has been found that the presence of these fillers improves the "cellularization" of the finished products by increasing the number of cells and reducing their dimension, and this leads to more homogeneous products which have improved properties.

It is known to use natural calcium carbonates with a maximum of 40 $\mu$ and an average particle diameter of between 2 and 3 microns.

The use of ultrafine natural calcium carbonates according to the invention offers substantial advantages as can be seen from the following Example:

Example 2a

In a mixture of the composition

| | | |
|---|---|---|
| PVC emulsion | 100 | p.b.w. |
| plasticizer | 80 | ,, |
| stabilizer Cd/Zn | 1.5 | ,, |
| Kieker azo-dicarboxamide decomposition initiator | 2 | ,, |
| natural calcium carbonate | 50 | ,, |
| azo-dicaboxamide | 2 | ,, | there is introduced an ordinary calcium carbonate, on the one hand, and an ultrafine natural calcium carbonate according to the invention, on the other hand; after thermal treatment at 190°C for 4 minutes, the properties listed in Table IIa were found:

Table IIa

| | ordinary carbonate | ultrafine carbonate |
|---|---|---|
| specific weight (g/cu.cm) | 0.305 | 0.290 |
| elongation coeff. | 4.5 | 4.7 |
| breaking strength (daN/sq.cm) | 8 | 10 |
| elongation (%) | 150 | 170 |
| shrinkage | 20 | 32 |
| cellularization | rather fine numerous open cells irregular | very fine few open cells regular |

The use of the ultrafine natural calcium carbonates of the invention therefore offers the following special advantages:

a. a more homogeneous, finer and more regular cellularization;
b. an improved elongation of the mixtures;
c. improved mechanical properties of the final products.

The ultrafine natural calcium carbonates of the invention are also preferably suitable as fillers for hard PVC.

It is known to use natural calcium carbonates of conventional particle size with a maximum of 10 to 20 $\mu$ and an average statistical particle diameter of 2 to 4 $\mu$ as fillers in the production of hard PVC. The filler is exclusively added for the purpose of price reduction. Improvements of the mechanical properties and surface appearance are not achieved. If improvements of the mechanical properties and surface appearance are to be achieved, calcium carbonates obtained by precipitation are used in accordance with the state of the art. However, these calcium carbonates have the disadvantage of being comparatively expensive, difficult to disperse in the resin and applicable only in small amounts.

The following Examples again show the superiority of the ultrafine natural calcium carbonates of the invention.

Example 3a:

Comparison of the calcium carbonate of the invention with an ordinary calcium carbonate.

| mixture: | PVC (K-value 70) | 100 | p.b.w. |
|---|---|---|---|
| | lead stabilizers | 3 | " |
| | lubricant | 1 | " |
| | filler | 8 | " |

Table IIIa

| | ordinary calcium carbonate | ultrafine calcium carbonate |
|---|---|---|
| breaking strength (kg/sq.cm) | 420 | 520 |
| elongation at break (%) | 15 | 100 |
| breaking energy at 0°C (impact kg/cm) | 50 | 90 |
| surface appearance | dull to "glazed" | brilliant |

Example 3b:

Comparison between a precipitated calcium carbonate and the ultrafine natural calcium carbonate of the invention:

| mixture: | PVC (K-value 70) | 100 | p.b.w. |
|---|---|---|---|
| | lead stabilizer | 3.5 | " |
| | lubricant | 2.5 | " |
| | filler | 2-10-20 | " |

Table IIIb

| type of filler | precipitated calcium carbonate | | ultrafine nature calcium carbonate surface-treated | | |
|---|---|---|---|---|---|
| amount of filler | 2 | 10 | 2 | 10 | 20 |
| breaking strength (kg/sq.cm) | 580 | 430 | 550 | 470 | 430 |
| elongation (%) | 130 | 65 | 125 | 85 | 60 |
| elasticity module (kg/sq.cm × 10³) | 29 | 31 | 29 | 32 | 36 |
| deflection at 60°C under 2.5 kg (mm) | 2.1 | — | 2.1 | 2 | 1. |
| impact strength (kg/m) | 19 | 10 | 20 | 20 | 6 |
| surface appearance | brilliant br. | | brilliant | | |

The Table shows
that very small amounts of filler virtually give the same results as do precipitated calcium carbonate;
that the mechanical properties obtained with medium amounts of filler are still comparable with those achieved with precipitated calcium carbonate, with the exception of the impact strength which is found to be superior:
that the properties obtained with large amounts of filler are still acceptable, whereas it is not possible to realize the same mixtures with precipitated carbonates.

The use of the ultrafine natural calcium carbonates of the invention as fillers in hard PVC thus offers the following principal advantages:
a. an excellent surface appearance of the final product;
b. good mechanical properties, even in the case of very high proportions of filler;
c. improved resistance to ageing.

The ultrafine natural calcium carbonates of the invention are also preferably suitable as fillers in coating PVC.

Natural calcium carbonates are very widely used as fillers for coating PVC or for calendering. The filler serves not only to reduce the cost of material of the mixture, it also assists in improving the opacity of the materials.

However, the use of conventional carbonates is restricted either because of the comparatively large particle sizes which preclude the use in very thin layers, or because of the comparatively low degree of whiteness which makes it necessary to increase the content of expensive white pigment in order to compensate for this adverse effect.

Both disadvantages can be obviated by using the ultrafine natural calcium carbonate of the invention, as will be shown with the aid of the following Example:

Example 4a:

as control material serve foils or layers of 100 microns thickness, based on PVC which has been pigmented with 10 parts by weight per 100 parts of titanium dioxide resin. This is compared with
a. a mixture containing, in addition, 30 parts by weight per 100 parts of resin, of an ordinary calcium carbonate with a good degree of whiteness;
b. a mixture containing a calcium carbonate of the particle size according to the invention and with a very high degree of whiteness, the proportions between $TiO_2$ and filler being adjusted in order to achieve the same opacity of the layer.

The characteristics of the fillers used, the content of calcium carbonate and $TiO_2$, and the results are listed in Table IVa.

Table IVa

| | sample | layer thickness 100μ | |
|---|---|---|---|
| | | ordinary calcium carbonate | calcium carbonate acc. to invention |
| maximum (μ) | | 43–1 | 4–0.1 |
| average statistical particle diameter (μ) | | 4 | 0.6 |
| whiteness in dioctyl phthalate (Tristimulus filter, blue) | | 40 | 59 |
| content of $TiO_2$ (% resin) | 10 | 10 | 9 |
| content of carbonate (% resin) | — | 30 | 40 |
| covering power (%) | 91.5 | 92 | 92 |
| whiteness with Tristimulus filter | | | |
| red | 91 | 88.5 | 90 |
| blue | 86 | 81.5 | 84 |
| green | 90.5 | 87.5 | 89 |
| tinting strength | +5.5 | +8.0 | +6.4 |
| shade | | yellow | grey |

The measured values show that, with the same opacity, the ordinary calcium carbonate yields mixtures having a lower degree of whiteness than the test sample, whereas the use of the ultrafine natural calcium carbonate leads to an improvement of the whiteness, in spite of a slight reduction of the pigment dose and a strong increase in the amount of filler.

Example 4b:

Layers of 35 microns thickness were measured for which very large amounts of pigment have to be used in order to achieve the maximum opacity and for which the use of ordinary calcium carbonates is excluded because of the small layer thickness, compared with the coarsest particles of the filler.

The comparison relates to a test mixture containing 40 parts by weight per 100 parts of titanium dioxide resin and to a mixture with the calcium carbonate of the invention wherein the amounts of filler and white pigment were adjusted in order to achieve equal opacity.

Table IVb shows that the use of the ultrafine natural calcium carbonate with a high degree of whiteness enables the amount of expensive pigment to be appreciably reduced, the whiteness being slightly superior to that of the test sample.

Table IVb

|  |  | Layer thickness 100 |  |
| --- | --- | --- | --- |
|  | content of TiO$_2$ (% resin) | 40 | 32 |
|  | content of carbonate (% resin) | — | 60 |
| covering power (%) |  | 93.5 | 93.5 |
| whiteness with Tristimulus filter | red | 93.5 | 93.5 |
|  | blue | 89 | 94.5 |
|  | green | 93 | 94.5 |

Table IVb-continued

|  | Layer thickness 100 |  |
| --- | --- | --- |
| tinting strength | +5.0 | +5.0 |

The use of the ultrafine natural calcium carbonate of the invention in coating PVC thus offers the following principal advantages:
 a. an improvement of the whiteness of the mixtures;
 b. a saving of pigment for a predetermined equal whiteness and opacity;
 c. the possibility of working with very thin layers (<20 - 25 microns).

What we claim is:

1. A filled polymer, the filler comprising ultrafine natural calcium carbonate having an average statistical particle diameter of from 0.5 to 0.7 $\mu$ and a maximum diameter of from 3 to 4 $\mu$.

2. A filled polymer according to claim 1, wherein the polymer comprises rubber, a polyvinyl chloride-based foam, hard polyvinyl chloride or a polyvinyl chloride coating.

3. A filled polymer according to claim 1, wherein the filler is chalk produced from coccolith shells.

4. A filled polymer according to claim 1, wherein the filler is crystalline calcite.

5. A filled polymer according to claim 2 wherein the carbonate is chalk from coccolith shells.

6. A filled polymer according to claim 2 wherein the carbonate is crystalline calcite.

7. The filler polymer of claim 1 wherein the polymer comprises polychloroprene.

8. The filler polymer of claim 1 which is a polyvinyl chloride-based foam.

* * * * *